March 17, 1925.
B. O. AUSTIN
1,529,762
CONTROL SYSTEM
Filed April 12, 1921
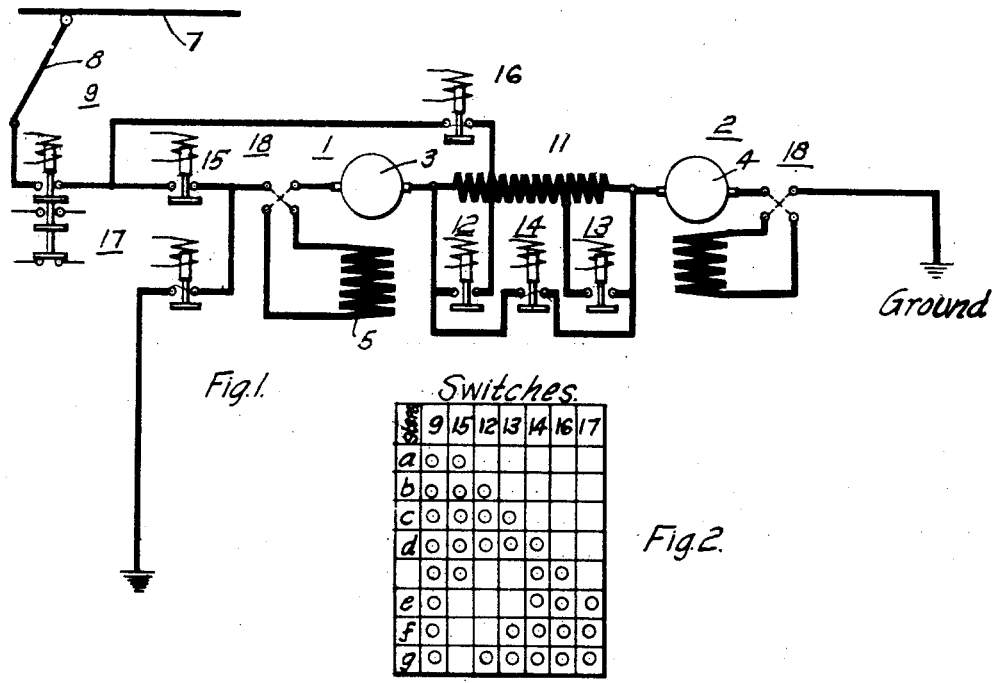
Fig.1.
Fig.2.
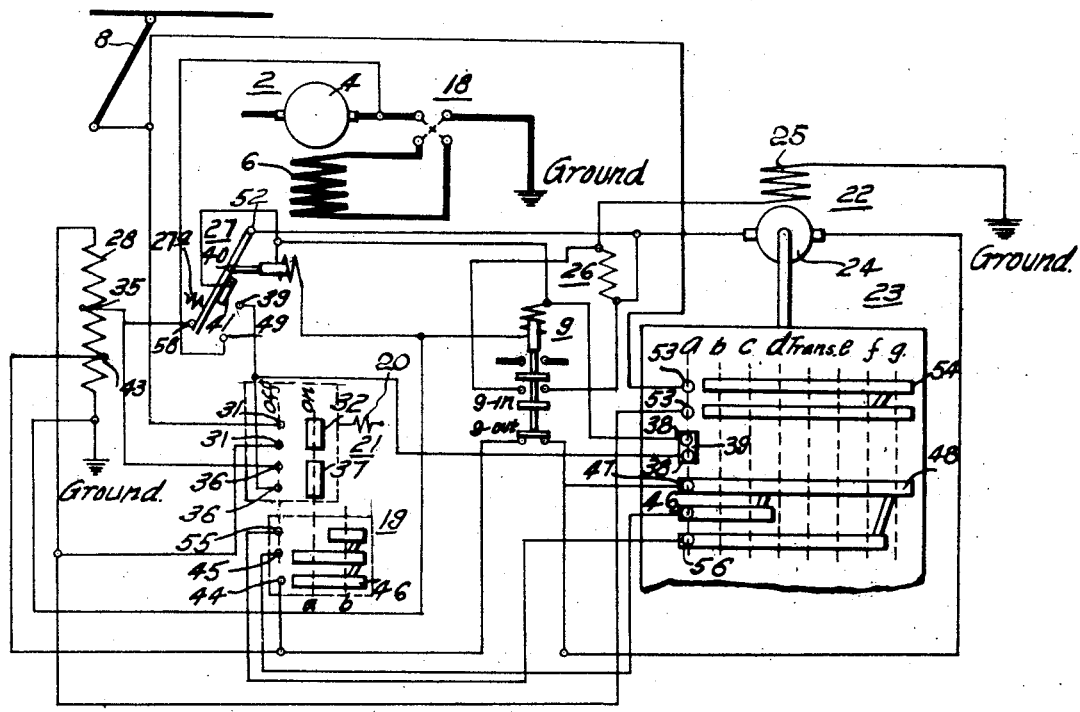
Fig.3.
WITNESSES:
K. C. Clowes
H. C. Lowe
INVENTOR
Bascum O. Austin.
BY
Wesley G. Carr,
ATTORNEY Patented Mar. 17, 1925.

1,529,762

UNITED STATES PATENT OFFICE.

BASCUM O. AUSTIN, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed April 12, 1921. Serial No. 460,612.

*To all whom it may concern:*

Be it known that I, BASCUM O. AUSTIN, a citizen of the United States, and a resident of Wilkinsburg, in the county of Allegheny and State of Pennsylvania, have invented a new and useful Improvement in Control Systems, of which the following is a specification.

My invention relates to motor-control systems and it has particular relation to the operation of a main controller for governing the acceleration of a plurality of motors that are used in driving an electrical vehicle.

The object of my invention is to provide an improved method of controlling the forward and reverse operation of a motor that actuates a main controller of a control system.

Heretofore, a pilot motor has been employed to actuate a main controller of a control system and in my co-pending application filed October 6, 1919, Serial No. 328,847, and assigned to the Westinghouse Electric & Manufacturing Company, I have shown a motor-actuated main controller that has its speed governed in accordance with the load upon a plurality of main motors of a control system. The main controller that is described in that application is returned to its "off" position by an auxiliary or pilot motor actuating it in a forward direction through the remaining portion of a complete revolution.

Briefly speaking, my invention consists in providing means for governing the forward operation of a motor that actuates a main controller so that its speed in a forward direction is determined by the load upon the main motors, and reversing the operation of the auxiliary motor by reversing the direction of the current traversing the armature thereof without reversing the direction of the current traversing the field-magnet winding and without de-energizing the motor by disconnecting it from its source of energy.

Means is also provided for maintaining the voltage across the terminals of the field-magnet winding of the auxiliary motor substantially constant and in the same direction, regardless of the direction of current traversing the armature thereof.

For a better understanding of my invention, reference should be made to the accompanying drawing, Figure 1 of which is a schematic view of the main circuits and switches of a motor-control system for actuating an electric vehicle;

Fig. 2 is a sequence chart showing the order of closure of the contactors or switches shown in Fig. 1; and Fig. 3 is a diagrammatic view of the auxiliary circuits governing the contactors shown in Fig. 1.

Referring particularly to Fig. 1 of the drawing, a plurality of motors 1 and 2 having armatures 3 and 4, respectively, and series field-magnet windings 5 and 6, respectively, are energized from a substantially constant voltage source of electrical energy, such as a trolley 7, through a circuit comprising a trolley-pole 8, a circuit-breaker or line switch 9, a starting resistor 11 and a plurality of accelerating contactors 12, 13 and 14. Series contactor 15 and parallel contactor 16 together with ground contactor 17 are employed for connecting the motors 1 and 2 in series relation and in parallel relation. A reverser 18, here shown in a conventional manner, is employed to reverse the connections of the field-magnet windings 5 and 6 with relation to the armatures 3 and 4, respectively.

Referring to Fig. 3 of the drawing, a master controller 19 and a body-actuated device or dead-man's release 21, preferably of the foot-control type, which is biased to its "off" position by a spring 20 and which governs the operation of an auxiliary or pilot motor 22, which actuates a main controller 23 having a plurality of operating positions *a* to *g*, inclusive. The main controller 23 is illustrated as being of the usual drum type; however, it would be equally satisfactory if it were cam-operated, as will be understood.

The motor 22 has an armature 24 and a series field-magnet winding 25. An auxiliary or control resistor 26 is connected in series relation to the field-magnet winding 25 and may be shunted by interlock 9-in. The value of the resistor 26 will determine the speed of the motor 22, when the main controller 23 is being actuated in a reverse direction. The armature 4 and series field-magnet winding 6 of the motor 2 are illustrated in Fig. 3 to show the manner in which the series field-magnet windings 6 and 25 of the motors 2 and 22, respectively, are connected in parallel relation during the forward operation of the main controller 23.

A relay 27 is provided for governing the forward and reverse operation of the auxiliary motor 22 in a manner that will be hereinafter more fully set forth. The portion of the reverser 18 which reverses the connection of the field-magnet winding 6 of the motor 2 is shown diagrammatically in Fig. 3.

The accelerating contactors 12, 13 and 14, series contactor 15, parallel contactor 16 and ground contactor 17 have their respective actuating coils energized by circuits comprising the main controller 23 and main control resistor 28. For the sake of clearness, these circuits have been omitted, as the manner of effecting their operation, in accordance with the sequence chart of Fig. 2, is well-known in the art.

The relay 27 is provided with a movable arm 40 which is normally biased by means of the spring 27a to a position in which the arm 40 bridges contact terminals 52 and 58. When the actuating coil of relay 27 actuates the arm 40 to its other or second position, the circuit comprising the contact terminals 52 and 58 is broken and a circuit comprising the contact member 40 and contact terminals 52 and 49 is established. In the latter position, a second circuit is also established by an insulated contact block or terminal 41, which is mounted on the arm 40, engaging a stationary contact block 39.

The operation of the control system is begun by actuating the body-operated device 21 to its "on" position and the master controller 19 from its "off" position to position a, corresponding to series connection of the motors. A circuit is thereby established from the trolley 7 through contact terminals 31 of the foot-control device 21, which are bridged by contact segment 32, and control resistor 28 to ground.

When the control resistor 28 is energized, the actuating coils of the relay 27 and the circuit-breaker 9 are energized by a circuit from a tap-point 35 of the control resistor 28, through contact terminals 36 of the body-actuated device 21, which are bridged by contact segment 37, contact terminals 38 of the main controller 23, which are bridged by contact segment 39, and the parallel-connected actuating coils of the relay device 27 and the circuit-breaker 9 to ground.

A holding circuit is provided for the relay device 27 and the circuit-breaker 9 from the tap-point 35 on the control resistor 28 through contact terminals 36 of the body-actuated device 21, which are bridged by contact segment 37, contact terminal 39 of the relay device 27, contact member 41, which is insulated from the movable arm 40 upon which it is mounted, and parallel-connected actuating coils of the relay device 27 and the circuit-breaker 9 to ground. The relay device 27 and the circuit-breaker 9 thus will remain in their closed positions as long as the body-actuated device 21 occupies its "on" position.

When the relay device 27 and the circuit breaker 9 assume their closed positions, and the master controller is in position a, a circuit is established from the tap-point 43 on the control resistor 28 through contact terminals 44 and 45 of the master controller 19, which are bridged by contact segment 46, contact terminals 46 and 47 of the main controller 23, which are bridged by contact segment 48, armature 24 of the pilot motor 22, interlock 9-in and series field-magnet winding 25 to ground.

The series field-magnet windings 6 and 25 of the motors 2 and 22, respectively, are connected in parallel relation, when the relay 27 assumes its closed position, by a circuit that is established from the series field-magnet winding 6 of the motor 2 through contact terminal 49 of the relay 27, contact member 40, contact terminal 52, interlock 9-in and series field-magnet winding 25 to ground.

The effect of connecting the windings 6 and 25 in parallel relation is to increase the voltage across the series field-magnet winding 25, when the voltage across the series field-magnet winding 6 of the main motor 2 is increased, thereby decreasing the speed of the auxiliary motor 22.

In other words, the speed with which the main controller 23 is actuated in the forward direction is determined by the load under which the main motor 2 is operating and, as the load upon the main motor 2 increases, the main controller 23 will be actuated more slowly, whereby the acceleration of the motors 1 and 2 will consume a greater interval of time.

When the main controller 23 is actuated to position b, a second circuit for energizing the control resistor 28 is established from the trolley 7 through contact terminals 53 of the main controller 23, which are bridged by contact segment 54, and control resistor 28 to ground.

This second circuit is maintained throughout positions b to q, inclusive, of the main controller 23 for the purpose of returning the main controller 23 to its first position after the circuit-breaker 9 is opened. Its operation will be hereinafter more fully described.

The main controller 23 will be actuated as far as position $d$ by the motor 22, when the master controller 19 occupies position $a$, thereby effecting a gradual short-circuit of the resistor 11, as will be understood from the sequence chart, Fig. 2. In position $d$ of the main controller, contact terminal 46 thereof no longer engages contact segment 48 of the main controller and thus the previously-traced circuit comprising the armature 24 of the auxiliary motor 22 is de-energized and the motor 22 will cease to operate.

When the master controller 19 is actuated to position $b$, a circuit is established from a tap-point 43 on the control resistor 28, through contact terminals 44 and 55 of the master controller 19, which engage contact segment 46, contact terminals 56 and 47 of the main controller 23, which are bridged by contact segment 48, armature 24 of the motor 22, interlock 9-in and series field-magnet winding 25 to ground.

When the main controller 23 reaches its position $g$, the circuit comprising the armature 24 of the motor 22 is broken by reason of contact terminal 56 no longer engaging contact segment 48. In position $g$, which is the full-parallel running position for the motors 1 and 2, circuit breaker 9, parallel contractor 16, ground contactor 17 and accelerating contactors 12, 13 and 14 are closed, in accordance with the sequence chart of Fig. 2.

If the operator should release the body-actuated device 21, the dead-man's release feature thereof causes the contact segments 32 and 37 to return to their "off" position, both the circuit from the trolley 7 through contact terminals 31 of the body-actuated device 21 and control resistor 28 and also the circuit comprising the actuating coils of the relay device 27 and the circuit-breaker 9 being broken, thereby causing the relay device 27 to return to its initial position shown in the drawing and the circuit breaker 9 to assume its open position.

When the relay device 27 returns to its initial position, the direction of current through the armature 24 of the motor 22 is reversed by a circuit established from the tap-point 35 on the control resistor 28 through contact terminal 58 of the relay 27, contact member 40, contact terminal 52, armature 24 of the auxiliary motor 22, interlock 9-out, tap-point 43 of the control resistor 28 and a portion of the control resistor to ground. The series field-magnet winding 25 will remain energized in the same direction as before, but in a lesser degree, by a circuit established from the tap-point 35 on the control resistor 28 through contact terminal 58 of the relay device 27, contact member 40, contact terminal 52, auxiliary resistor 26 and series field-magnet winding 25 to ground.

As the armature 24 of the motor 22 is energized in the reverse direction and the series field-magnet winding 25 is energized in the same direction but in a lesser degree, the motor 22 will reverse its operation and return the main controller 23 to position $a$ more rapidly than during forward operation.

The control resistor 28 and, hence, the motor 22 are de-energized when the main controller 23 returns to position $a$, as the circuit from the trolley 7 through contact terminals 53 of the main controller 23, contact segment 54 and control resistor 28 to ground is broken by reason of the contact segment 54 no longer engaging the contact terminals 53.

If for any reason, a failure of power should occur before the auxiliary motor 22 has returned the main controller 23 to its initial position $a$, no injury will occur to the control system upon a return of the power. Upon such failure of power, the actuating coil of the relay 27 will become de-energized. thereby permitting the relay 27 to be moved by its biasing spring $27a$ to its "off" position, which is the position shown in Fig. 3 of the drawing. Since the contact segment 39 of the main controller 23 bridges only the contact terminals 38, when the main controller 23 is in position $a$, it will be impossible to energize the parallel-connected actuating coils of the relay 27 and the circuit-breaker 9 and the relay 27 and circuit breaker 9 will remain in their open positions.

However, a circuit will be established for energizing the pilot motor 22 to cause it to return the main controller 23 to position $a$. This circuit is established from the trolley 7 through contact terminals 53 of the main controller 23, which are bridged by contact segment 54, a portion of control resistor 28, contact terminal 58 of the relay device 27, contact member 40, contact terminal 52, armature 24 of the motor 22, interlock 9-out, and a portion of the control resistor 28 to ground.

The series field-magnet winding 25, which is temporarily connected in parallel relation with the armature 22, is energized by a circuit from the tap-point 35 on the control resistor 28 through contact terminal 58 of the relay device 27, contact member 40, contact terminal 52, auxiliary resistor 26 and series field-magnet winding 25 to ground.

From the above description it is apparent that I have provided means comprising a main controller for controlling the acceleration of a plurality of main motors, the speed of the main controller being governed by the load upon one of the main motors. It is also apparent that by having the motor 22 actuate the main controller 23 to its "off" position, after the circuit-breaker 9 is opened, an important advantage is secured by thus bringing the main controller 23 into position for immediate acceleration of the motors 1 and 2 upon the operator actuating the master controller to position *a*. This advantage will be appreciated, when it is considered that in the prior systems a time interval must elapse before the main controller is in position to accelerate the main motors, if the auxiliary motor actuates the main controller to its initial position only upon closure of the line-switch or circuit-breaker.

While I have shown my invention in a preferred form, minor modifications may be made in the arrangement of circuits and apparatus employed without departing from the spirit of my invention. I desire, therefore, to be limited only by the scope of the appended claims.

I claim as my invention:

1. The combination with a motor having an armature and a series field-magnet winding and a source of electrical energy for energizing said motor, of a control device driven by said motor and adapted at times to control said motor, and means for connecting said source to said motor between said armature and said winding to reverse the operation of said armature without disconnecting said armature and said winding from said source.

2. The combination with a motor having an armature and a series field-magnet winding and means for energizing said armature and said winding for effecting operation of said motor in one direction, of a control drum driven by said motor and adapted under predetermined conditions to control the motor, and means for reversing the direction of operation of said motor without disconnecting said armature and said winding from said energizing means and without changing the connection of said armature to said winding.

3. The combination with a motor having an armature and a series field-magnet winding, and means for energizing said armature and winding for effecting operation of said motor in one direction, of means driven by said motor and adapted under predetermined conditions to control said motor, and means for reversing the direction of operation of said motor without disconnecting said armature and said winding from said energizing means, and without changing the connection of said armature to said winding, said reversing means comprising a resistor in series relation with said winding and means for shunting said resistor.

4. The combination with a motor having an armature, a series field-magnet winding and a resistor permanently connected in series relation with said winding, of means for shunting said resistor, means for energizing said motor, and means for reversing the direction of current traversing said armature without reversing the direction of current through said winding, said shunting means co-operating with said reversing means to vary the value of current traversing said winding during reverse operation of said motor.

5. The combination with a main motor having an armature and a field-magnet winding, and a plurality of contactors for governing the operation of said motor, of a main controller for controlling the sequence of operation of said contactors, means comprising a motor having an armature and series field-magnet winding for actuating said controller, means for connecting the field-magnet winding of said main and auxiliary motors in parallel relation and means for reversing the direction of current through the armature of said auxiliary motor without reversing the direction of current through the field-winding thereof.

6. The combination with a main motor having an armature and field-magnet winding and an auxiliary motor having an armature and field-magnet winding, of means for energizing said auxiliary motor, means for maintaining the voltage across said windings substantially equal and means for reversing the direction of operation of said auxiliary motor without disconnecting said auxiliary motor from said energizing means.

7. The combination with a main motor and a main controller for governing the operation of said motor, of an auxiliary motor for operating said main controller in a forward and in a reverse direction, means for energizing said auxiliary motor to operate it in one direction, and means for reversing the direction of operation of said auxiliary motor without disconnecting said auxiliary motor from said energizing means.

8. The combination with a main motor and a main controller for governing the operation of said motor, of an auxiliary motor for operating said main controller in a forward and in a reverse direction, means for energizing said auxiliary motor to operate it in one direction, means for governing the speed of said auxiliary motor in accordance with the load upon said main motor, and means for reversing the direction of operation of said auxiliary motor without disconnecting said auxiliary motor from said energizing means.

9. The combination with a plurality of main motors, each having an armature and a field-magnet winding, and means comprising a control resistor and a main controller for governing the acceleration of said motors, of an auxiliary motor having an armature and field-magnet winding for actuating said main controller in a forward and in a reverse direction, said auxiliary motor being permanently connected to a point on said control resistor to secure forward operation of said motor, and means comprising a relay for connecting a field-magnet winding of one of said main motors in parallel relation to the field-magnet winding of said auxiliary motor during forward operation of said auxiliary motor, said relay also connecting another point on said resistor to said auxiliary motor to reverse the current in the armature thereof during reverse operation of that motor.

10. The combination with a dynamo-electric machine and a main controller for governing said machine, of a motor having an armature and a series field-magnet winding permanently connected one to the other for actuating said controller in a forward and in a reverse direction and automatic means for energizing said motor to return said controller to its initial position upon the de-energization of said machine.

11. The combination with a dynamo-electric machine, and a main controller for governing said machine, of a source of electrical energy, power-actuated means connected to said source for operating said controller in a forward and in a reverse direction, and means for reversing the direction of said operation of said power-actuated means after said machine has become de-energized to return said controller to its initial position prior to disconnecting said power-actuated means from said source.

12. The combination with a dynamo-electric machine and a plurality of switches for governing the operation of said machine, of a main controller for governing said switches, a source of electrical energy, means comprising an electrical device connected to said source for actuating said controller, a master controller for governing the energization of said device and means for reversing the energization of said device without disconnecting said device from said source to return said main controller to its initial position upon said master controller being actuated to its initial position.

13. The combination with a main dynamo-electric machine and a main controller having a plurality of operating positions for governing the energization of said machine, of a motor having a series field-magnet winding and an armature connected together for actuating said controller, a circuit-breaker for governing the energization of said machine, a master controller having an "off" position and an operating position for governing the energization of said motor, and means for energizing the armature of said motor in a reverse direction without disconnecting said armature from said winding to actuate said controller from one position to another position upon the opening of said circuit-breaker.

14. The combination with a main motor and a circuit-breaker for governing the energization of said motor, of a main controller having a plurality of positions for governing the energization of said motor, an auxiliary motor for actuating said controller through its several positions, a master controller having an "off" position and a plurality of operating positions for governing the energization of said auxiliary motor, and means comprising a relay governed by the position of said master controller, for energizing said auxiliary motor to return said controller to its first position upon the opening of said circuit-breaker.

15. The combination with a main motor having an armature and a field-magnet winding, of a main controller having a plurality of positions for governing the acceleration of said motor, an auxiliary motor for actuating said controller, said auxiliary motor having an armature and field-magnet winding permanently connected in series, a master controller for governing the energization of said auxiliary motor, and a relay device having a plurality of positions for governing the speed and direction of operation of said auxiliary motor and means comprising a switching device for governing said relay to control the forward and the reverse operation of said motor.

16. In a control system, the combination with a dynamo-electric machine and a power-actuated controller having a plurality of positions for governing the energization of said machine, of automatic means comprising a motor having an armature and a field-magnet winding permanently connected together for returning said controller to its initial position upon the de-energization of said machine, said means returning said controller to its initial position before the re-energization of machine, if said controller is in a position other than its initial position upon a re-energization of said system.

17. In a control system, the combination with a dynamo-electric machine, and a controller having a plurality of positions for governing the energization of said machine, of a source of electrical energy, an electrical device connected thereto for actuating said controller and means for so energizing said device without disconnecting it from said source to return said controller to its initial position upon the de-energization of said machine, said means preventing said machine from also becoming re-energized prior to the return of said controller to its initial position.

In testimony whereof, I have hereunto subscribed my name this 28th day of March, 1921.

BASCUM O. AUSTIN.